Figure 1:
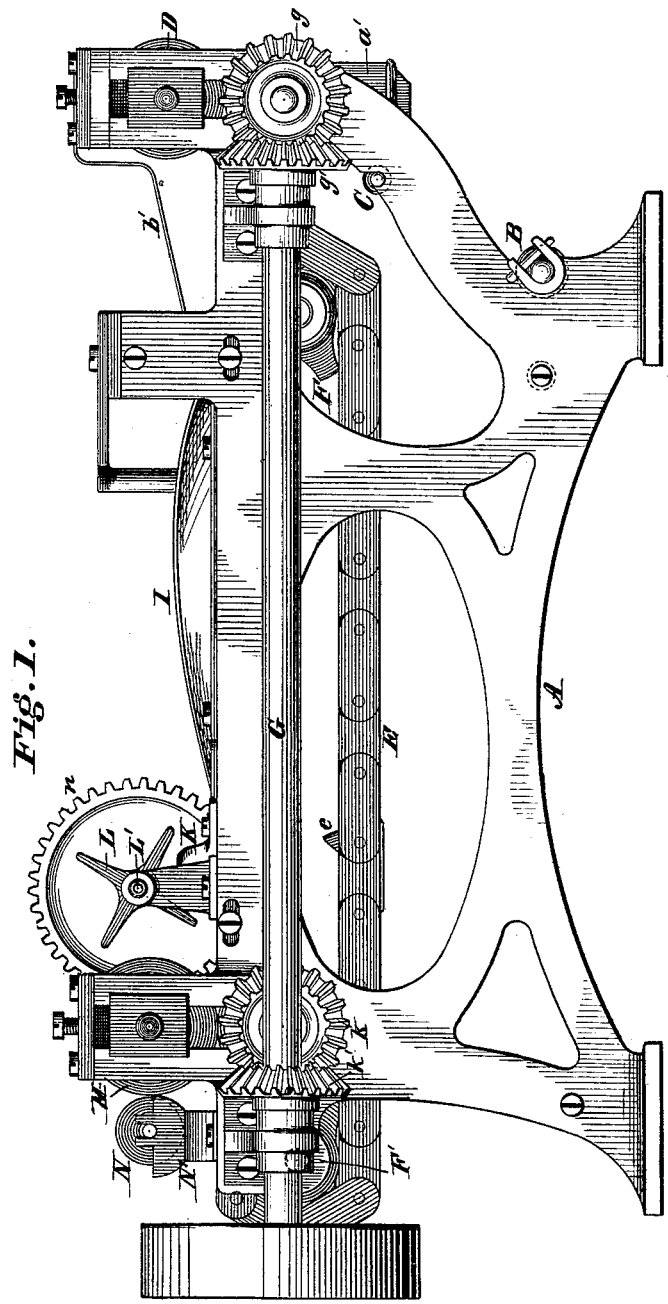

6 Sheets—Sheet 3.

T. W. GRINTER.
PAPER-BAG MACHINE.

No. 188,794. Patented March 27, 1877.

Attest.
Chas. A. Bauer
Wm J. Payton.

Inventor.
Thomas W Grinter
By his Atty
W. D. Baldwin

T. W. GRINTER.
PAPER-BAG MACHINE.

No. 188,794. Patented March 27, 1877.

Attest.
Chas. A. Bower
Wm. J. Ayton

Inventor.
Thomas W. Grinter
By his atty
Wm. D. Baldwin

6 Sheets—Sheet 5.
T. W. GRINTER.
PAPER-BAG MACHINE.
No. 188,794. Patented March 27, 1877.
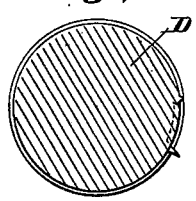
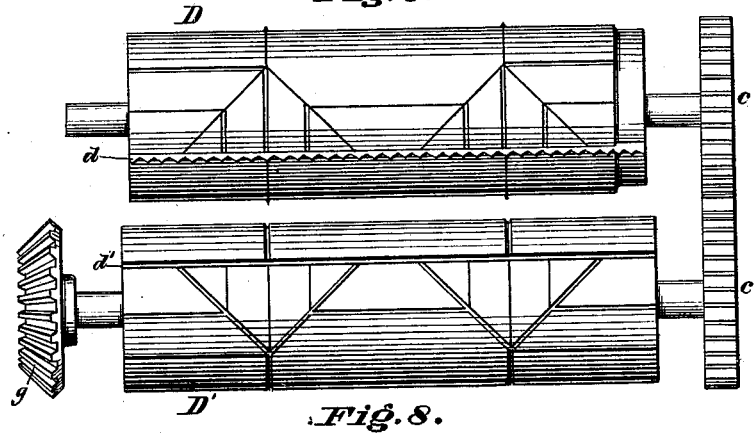
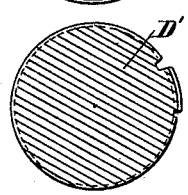
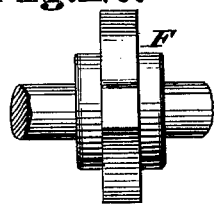
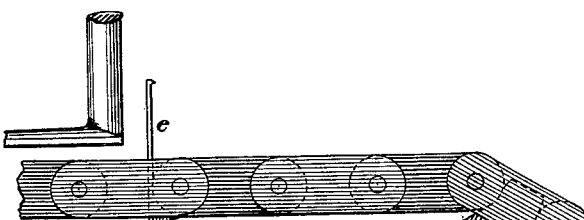
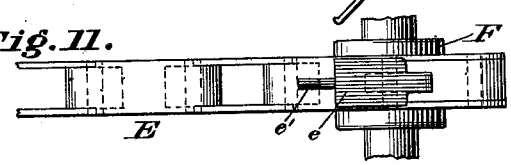
Attest.  
Chas. A. Bauer  
Wm J. Payton.
Inventor.  
Thomas W. Grinter  
By his Atty  
Wm D. Baldwin 6 Sheets—Sheet 6.

T. W. GRINTER.
PAPER-BAG MACHINE.

No. 188,794. Patented March 27, 1877.

Attest.
Chas. A. Bauer
Wm. J. Peyton

Inventor.
Thomas W. Grinter
By his Atty
Wm. D. Baldwin

UNITED STATES PATENT OFFICE.

THOMAS W. GRINTER, OF CINCINNATI, OHIO, ASSIGNOR OF ONE-HALF HIS RIGHT TO JOSEPH F. JEWETT, OF SAME PLACE.

IMPROVEMENT IN PAPER-BAG MACHINES.

Specification forming part of Letters Patent No. 188,794, dated March 27, 1877; application filed June 14, 1875.

*To all whom it may concern:*

Be it known that I, THOMAS W. GRINTER, of Cincinnati, in the county of Hamilton and State of Ohio, have invented certain new and useful Improvements in Machinery for Making Paper Bags, of which the following is a specification:

My invention relates to that class of machines for making satchel-bottomed paper bags in which the blanks are cut from a web or strip of paper, and folded while passing continuously through the machine.

The object of the first part of my invention is to crease the open blank or strip of paper before it is formed into a tube, to facilitate the formation of the bottom folds of the bag. This object is attained by the combination of two feed-rollers, located in advance of the "former," the periphery of each of which is formed with dies or creasers, and recesses, to crease the blank or strip as it passes between them, both inwardly and outwardly, in lines on which the bottom is subsequently folded, the dies and recesses of one roller corresponding with the recesses and dies of the other, whereby the creases in those portions of the blank subsequently reversed by folding will, when thus reversed, be left in proper position relatively to the unfolded portion with the ridges of the creases projecting in the desired direction to facilitate the formation of the bottom folds.

The objects of the next part of my invention are to feed, form creases for both the side and bottom folds, and cut the blanks from a suitably-prepared strip of paper; which objects are attained by passing the strip between a pair of rollers located in advance of the former, the peripheries of which are so formed (for the purpose of creasing the blank both inwardly and outwardly) that the creases constitute the lines on which the bottom folds of the bag are subsequently made, one of the rollers having circumferential grooves, and the other corresponding creasing-dies in line with the edges of the former, one of said rollers being also provided with a severing-knife, and the corresponding roller being longitudinally grooved for its reception, whereby the rollers serve the threefold purpose of feeding, creasing, (both for the bottom and side or longitudinal folds,) and severing the blank from the strip.

The object of the next part of my invention is to provide simple and positive mechanism for conveying the severed blank to the former and folding mechanisms; which objects are attained by means of an endless carrying-chain, provided at proper intervals with clamps or fingers, the same being tripped or raised, and a continuous motion imparted to the chain by suitably-shaped sprocket-wheels, which, as soon as a blank is creased and severed from the strip by passing through the rollers before mentioned, seize and carry it forward to the folding and forming mechanism.

The objects of the next part of my invention are, to fold the blank into a tube, and to form the first bottom fold, on its creased end, on the line of the creases previously formed therein; which objects are attained by carrying the blank under a former, on each side of which are curved folding-plates, which gradually bend up and double over the sides of the blank as it passes between them on its way to the bottom folders, which folders consist of raised portions and curved arms secured to the table of the machine at a point near the ends of the curved side-folding plates, which, as the tube is drawn forward, and emerges from beneath the said side-folding plates, in connection with a revolving reel or arm, fold the bottom back on the line of the creases previously formed therein without the use of a plate upon which to form the fold.

My invention also has for its object the general improvement of paper-bag machinery, which improvements will hereinafter specifically be designated and pointed out in the claims.

The accompanying drawings show all my improvements as embodied in one machine in the best way now known to me. Obviously, however, some of them may be used without the others, and in machines differing in construction from the one therein shown.

Figure 2:
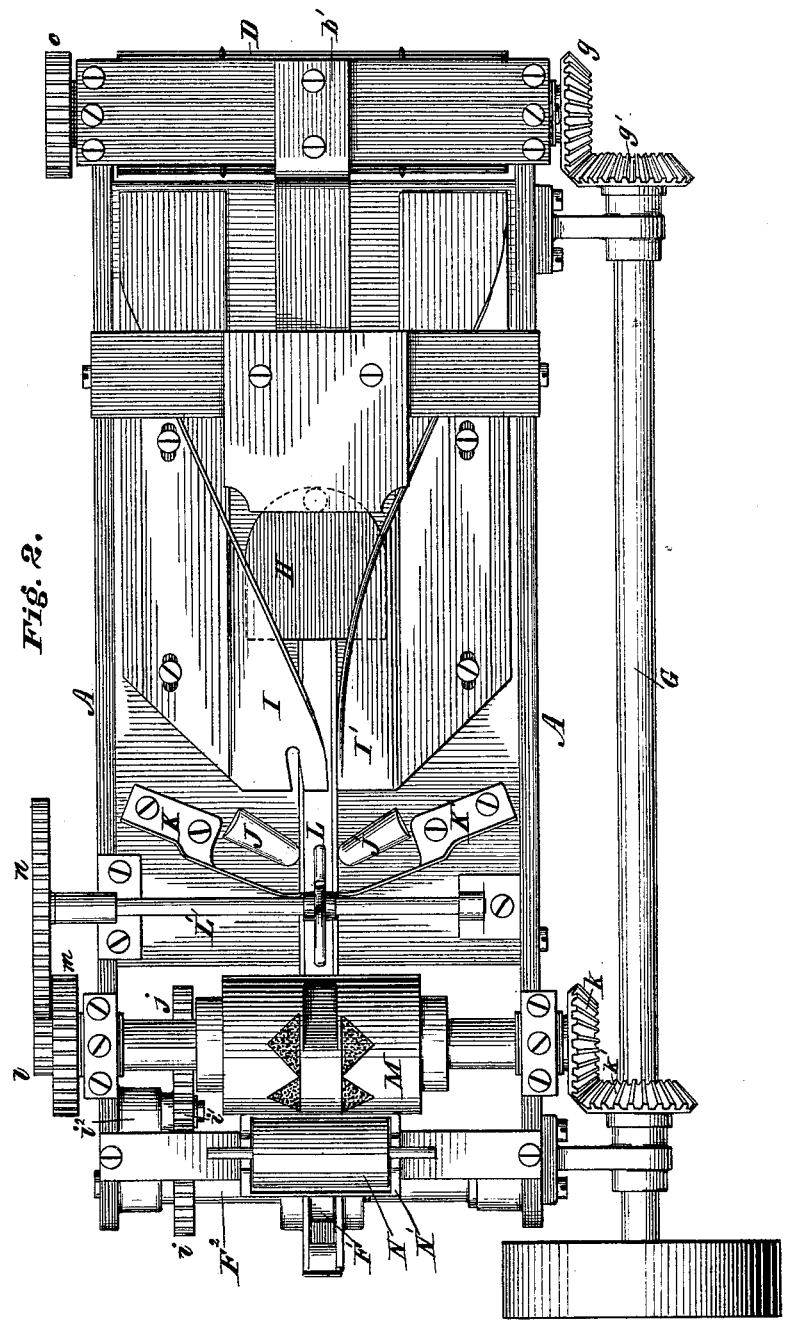
Figure 3:
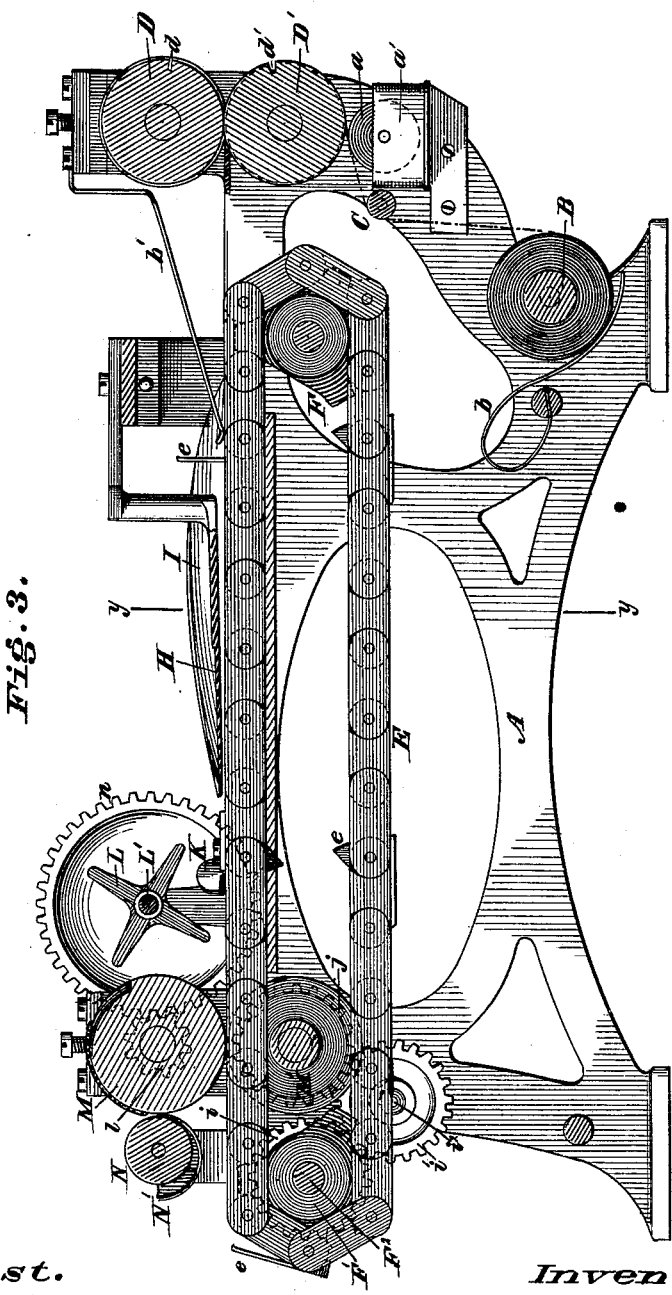
Figure 4:
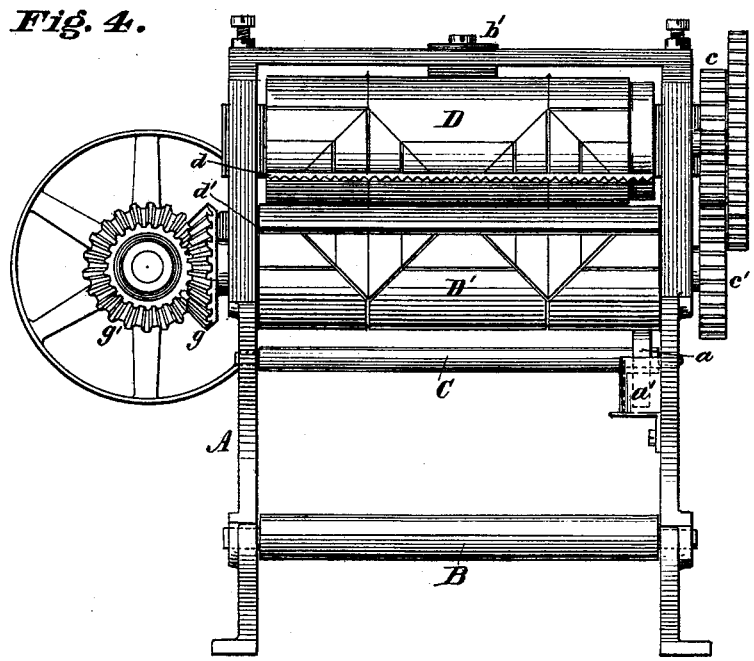
Figure 5:
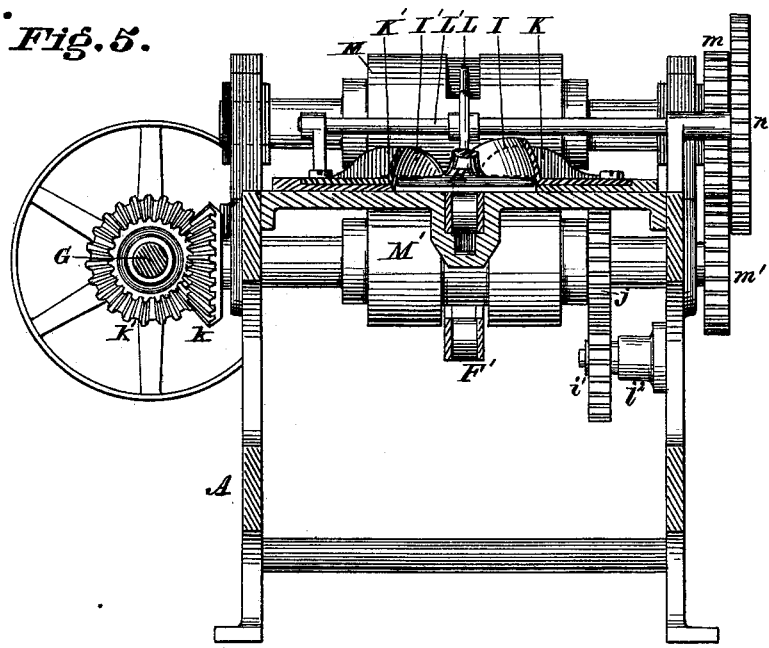
Figure 13:
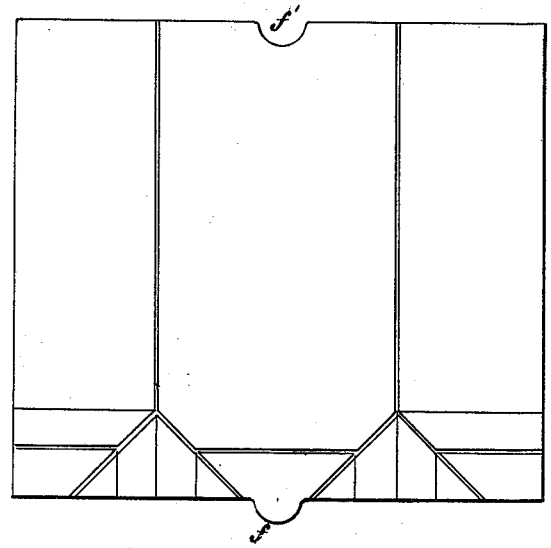
Figure 14:
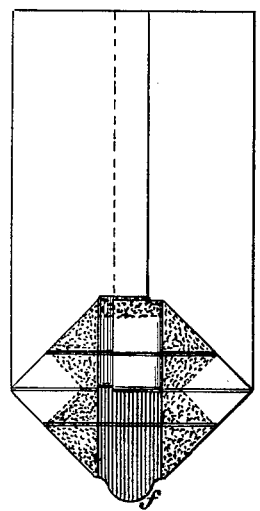
Figure 15:
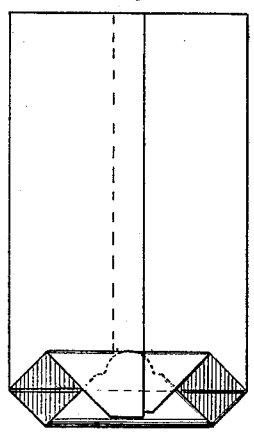
Figure 16:
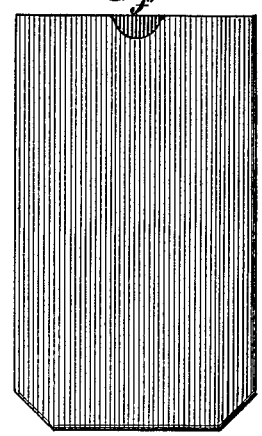

Figure 1 represents a side elevation of so much of a machine embodying my improvements as is necessary to illustrate the subject-matter herein claimed; Fig. 2, a top-plan view thereof; Fig. 3, a longitudinal central section;

Fig. 4, an end view, showing the feeding, creasing, and cutting mechanism; Fig. 5, a view in cross-section on the line y y of Fig. 3, looking toward the delivery end of the machine. Figs. 6 and 8 are views in elevation of the feeding, cutting, and creasing rollers. Figs. 7 and 9 are cross-sections of the same; Fig. 10, a side elevation of the carrying-chain, showing the manner of tripping the clamps or fingers; Fig. 11, a top view thereof; Fig. 12, a detached view of one of the sprocket-wheels for carrying the chain; Fig. 13, a view of a blank spread out after passing through the cutting and creasing rollers; Fig. 14, a view of the blank formed and folded out as it comes from the machine. Figs. 15 and 16 are views of the complete bag made by the machine herein shown and described when ready for use.

The operative parts of my machine are mounted in a strong durable frame, A, preferably of metal.

On the front end of this frame is journaled a suitable roller, B, upon which the roll or web of paper from which the blanks are to be cut is placed. The requisite tension to insure accurate feeding is kept upon the roller, in this instance, by a flat spring, b, secured to the frame.

The strip of paper (of a width equal to twice that of the bag to be formed, plus that of the side fold or flap) is fed to the machine by passing it up over a tension-roller, C, one of its edges after leaving this roller being properly gummed by contact with a paste-wheel, a, the trough a' in which it is mounted being, preferably, adjustable, and from thence the strip passes between the feeding and creasing rollers D D', which are adjustable vertically in their bearings in the frame, and have each formed upon its periphery dies or creasers and recesses for both inwardly and outwardly creasing the end of the strip as it passes between them, the creases thus formed projecting from the strip on the lines upon which the bottom folds of the bag are subsequently formed. Each roller, it will be seen, is provided with both creasing-dies and recesses, the dies upon each roller corresponding with and working in the recesses of the other. The longitudinal creases for the edge or side folds are formed by circumferential dies and recesses upon the respective rollers in line with the edges of the former upon which the tube is made, as will presently be explained. I may here remark, that, wherever shown on the rollers D D' in the drawings, the single lines represent the outward and the double lines the inward creasers.

One of these rollers, the upper one, D, in this instance, at the proper point is provided with a serrated knife, d, the other roller, D', having a longitudinal groove, d', therein for its reception. This knife, which is for the purpose of severing the blanks from the strip of paper on its way through the rollers D D', may be either curved or straight. I prefer it so made, with a small curve in its center, as to give to the blank, during the severing operation, the small lip f, Figs. 13 and 14, so that when the bag is finished it is provided with the recess f', Fig. 16, the object of which is that the bag may be more easily opened for use.

The creased end of the strip, after passing through rollers D D', is held in place during its forward movement by a spring-plate, b', until about the time the blank is being severed, when it is seized at its forward edge, near the center, by one of a series of fingers or clamps, e, pivoted to one of the links of a carrying-chain, E, at a distance apart somewhat greater than the length of the blanks. Each finger, in turn, is tripped or raised for closing down upon the edge of the blank by passing over a triangularly-shaped sprocket-wheel, F, and is forced down upon the blank at the proper moment by coming in contact with the heel of the former H, and is held down securely by a flat spring, e', bearing against its shoulder e'', clearly shown in Fig. 10.

The creased and severed blank is now to be formed into a tube, which is accomplished by the blank being carried by the endless traversing chain under a former, H, of a width corresponding to that of the bag to be made, and between curved folding-plates I I', on each side of the former H, which curved plates gradually bend up and double over the sides of the blank as it is passed between them on its way to the bottom-forming mechanism.

These curved plates are open-mouthed at the point where the blanks enter, but gradually bend over, their edges converging toward a common point. It will be noticed that the curved portion of the plate I is made deeper and wider than that of the one I', (see Fig. 5,) the object of which is to bend over a greater portion of the width of the blank upon that side, and thus to form a side flap or edge to project a short distance over the edge of the other side of the blank, by which they are pasted together. This overlapping edge, having previously been pasted, as hereinbefore described, is caused to adhere to the underlying fold by the pressure of the curved folders upon it.

As the chain traverses, the tubular blank now carried by it emerges from beneath the curved side-folding plates I I', its corners striking against the rounded raised portions or projections J J' on the table of the machine on either side of the path of the traversing-chain, which gives it a slight upward bend. This upward bend brings the corners of the tubular blank in contact with the curved surfaces of the bottom-folders K K' and, as the center of the lower portion of the tube is held down and drawn forward by the clamp, the mouth of the tube is opened. As it opens the top edge is struck by one of the arms of a reel, L, mounted on a revolving shaft, L', which still further opens the tube. As the bottom edge of the tubular blank is drawn forward by the clamp while its top edge is carried back by the reel L, and the sides are drawn under the bottom-folders K K', it results that the first bottom fold of the bag is formed on the lines of the creases previously made in the blank, as shown in Fig. 14, without folding it down upon a plate or follower.

After the first bottom folds of the tube have thus been formed, it is carried by the chain E between pressure and pasting rollers M M'. It will be noticed that the lower roller is provided with an annular groove, in which the endless chain runs, so that the clamps are enabled to pass between the rollers and in a line tangential thereto, so as to draw the blank between them far enough to allow them to bite upon it before it is released from the clamp, which is then tripped or raised to release the blank, this being accomplished by the chain passing over a triangular-shaped sprocket-wheel, F', like the one before described. The bearings of the upper roller M are rendered vertically adjustable by well-known means, and the roller is also recessed to receive suitable pads for applying paste to the bag-bottom, the paste being supplied from a wheel, N, journaled in an adjustable trough, N', on the frame.

From these pressure and pasting rollers the tube is carried by tapes to a table or stand, where the finishing folds are made by hand, or the finishing may be done by automatic mechanism, if preferred.

In operation, the end of the strip of paper is carried to the feeding, creasing, and severing rollers D D', between which it is passed, it being by them both inwardly and outwardly creased, the creases forming the lines upon which the folds of the bag are subsequently made, and is then severed into blanks, motion being imparted to these rollers, which are geared together by pinion-wheels $c$ $c'$, by the beveled cog-wheel $g$, located on the end of roller D', which meshes into a like wheel, $g'$, on the end of the main driving-shaft G, which is supported in suitable bearings on the frame, and which is driven by any suitable prime mover. As the creased blank passes from between the rolls it is clamped for a moment between the upper bearing-spring plate and the back of the traveling clamp, which rises up from below. The motion of this clamp, however, being more rapid than the feed of the blank, it is caused to pass far enough beyond the front edge of the blank to permit of the latter being thrown down in front of the clamp just as the clamp is forced down upon blank by coming in contact with the fixed former, by which means the seizure of the blank by the clamp is rendered certain. The severed blank is then carried to the side-folding or tube-forming mechanism, and from thence to the mechanism which forms the first bottom fold, as hereinbefore described, motion being communicated to the chain by the sprocket-wheel F', over which it passes, the sprocket-wheel being mounted upon a shaft, F''', provided with a spur pinion-wheel, $i$, which meshes into a like wheel, $i'$, mounted upon a stud-axle, $i''$, on the frame, which pinion in turn meshes into a pinion, $j$, located on the lower pressure-roller M', to which motion is communicated by a beveled cog-wheel, $k$, on its end meshing into a like wheel, $k'$, on the driving-shaft G. This roller M', on its end opposite that upon which the bevel cog-wheel $k$ is mounted, carries a spur-wheel, $m'$, which meshes with a like wheel, $m$, on the shaft of the upper roller M, which also carries a smaller pinion, $l$, to mesh with and impart motion to wheel $n$ on the end of shaft L', and consequently to the reel L, which assists in the operation of folding the end of the tube.

From the side and end folding mechanisms the tube is carried between the pressure-rollers M M, as before described.

By means of the roller D, provided with creasing dies and recesses, as shown, and the roller D', provided with recesses opposite to and corresponding with the dies of the roller D, and having dies opposite to and corresponding with the recesses of the roller D, it will be seen that while the formation of the longitudinal creases in lines upon which the blank is afterward folded into a tube is not interfered with, creases forming inward and outward projections or ridges in the strip or blank on lines which determine the bottom folds and facilitate their formation are made the width of the unfolded strip or blank, so that when the direction in which a portion of the creases are formed, or project, is reversed by the formation of the side or edge folds, such creases are left projecting in the proper direction to facilitate the subsequent manipulations to which the blank is subjected in forming the bottom folds.

I do not broadly claim the combination of a griper belt or chain for feeding the blanks, and a table for supporting the blanks while being operated upon; neither do I broadly claim the combination of a griper belt or chain, and a pasting device or devices.

I claim as of my own invention—

1. The combination, substantially as hereinbefore set forth, of creasing-rollers, constructed substantially as described, each provided with dies and recesses, and the dies of each roller corresponding with the recesses of the other, and operating upon the unfolded strip or blank to form the inward and outward creases therein, and the former, which forms the tube after the blank is creased by the rollers, leaving the creases in the blank in the proper condition for subsequent manipulations, as set forth.

2. The feeding, creasing, and blank-severing apparatus hereinbefore described, consisting of two rollers, one of which carries a knife to sever the blank from the paper strip when fed in a sufficient distance on its passage to the former, each roller being provided with creasing dies and recesses, the dies on each roller corresponding with the recesses on the other, whereby the flat paper strip is fed into the machine, creased both inwardly and outwardly while in a flat state, or before passing to the former, and cut into blanks, as set forth.

3. The blank-carrying mechanism, heretofore described, consisting of the combination of polygonal sprocket-wheels, an endless carrying chain mounted thereon, and a series of clamps pivoted on the chain at a distance apart slightly in excess of the length of the blank and tripped by passing over the sprocket-wheels, substantially as hereinbefore set forth.

4. The combination, substantially as hereinbefore set forth, of the polygonal sprocket-wheels, the endless chain, a rocking-clamp pivoted thereon, and a spring bearing on the clamp, whereby the latter is held close to the chain until tripped by the sprocket-wheel.

5. The combination, substantially as hereinbefore set forth, of the polygonal sprocket-wheels, the endless chain, the clamps pivoted thereon, and the former, whereby each clamp is successively turned up by the proper sprocket-wheel in front of the incoming blank, and turned down upon it by the former at the proper moment.

6. The combination, substantially as hereinbefore set forth, of the feeding, cutting, and creasing rolls, the traveling-clamp, and the plate-spring which bears upon the loose end of the blank, whereby the paper is first clamped between the spring and the back of the clamp, and is then held down by the spring in front of the clamp to be seized by it.

7. The combination, substantially as hereinbefore set forth, of the pasting-roller, the continuously rotating, feeding, cutting, and creasing rolls, the continuously-moving traveling clamp, the fixed former and the fixed folding-plates, whereby the web of paper is continuously pasted, creased, cut, and folded into tubular blanks, as described.

8. The combination, substantially as hereinbefore set forth, of the traveling-clamp, the fixed folders and the rotating reel, whereby the first bottom fold is formed in the tubular blank, as set forth.

9. The combination, substantially as hereinbefore set forth, of the pasting-roll, the feeding, cutting, and creasing-rollers, the traveling-clamp, the former, the side-folding plates, the end folders, and the rotating reel, whereby the web of paper is pasted, creased, cut, folded into a tubular blank, and the bottom fold formed by one continuous operation.

10. The combination, substantially as hereinbefore set forth, of tube-forming mechanism, a traveling-clamp, fixed end-folders, a rotating-reel, and pasting-rollers between which the blank is drawn by the clamp directly after the formation of the first bottom fold.

11. The combination, substantially as hereinbefore set forth, of rotating pasting-rollers, and an endless chain carrying a clamp and passing between the rollers.

In testimony whereof I have hereunto subscribed my name.

THOMAS W. GRINTER.

Witnesses:
GEORGE E. JEWETT,
FRED. E. COWING.